3,803,178
9-OXA-POLYHYDROPHENANTHRENE - 2 - CARBOXYLIC ACIDS AND DERIVATIVES THEREOF
John H. Fried, Palo Alto, Calif., assignor to Syntex Corporation, Panama, Panama
No Drawing. Filed May 1, 1970, Ser. No. 33,873
Int. Cl. C07d 7/18
U.S. Cl. 260—345.3                 12 Claims

ABSTRACT OF THE DISCLOSURE

Novel 9-oxa-polyhydrophenanthrene-2-carboxylic acids and derivatives thereof, useful as esterogenic and antifertility agents, processes and intermediates for their preparation.

The present invention relates to certain novel polyhydrophenanthrene derivatives and processes and intermediates for the production thereof.

More particularly, this invention relates to novel 9-oxa-polyhydrophenanthrene-2-carboxylic acids and derivatives thereof, represented by the following general formula:

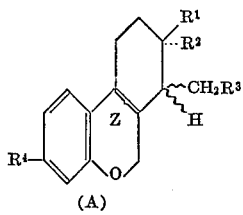

(A)

wherein $R^1$ is methyl or ethyl;
$R^2$ is carboxy, carb(lower)alkyloxy, formyl, hydroxymethyl or a conventional hydrolyzable ester or ether thereof;
$R^3$ is hydrogen or methyl;
$R^4$ is hydroxy, a conventional hydrolyzable ester or ether thereof or (lower)alkyloxy, and
Z is a carbon-carbon single or a carbon-carbon double bond between positions 11 and 12 of the oxaphenanthrene nucleus.

The term "lower alkyloxy" as used herein denotes the group —OAlkyl, "Alkyl" being a straight or branched chain saturated hydrocarbon group containing from 1 to 6 carbon atoms, inclusive, such as methyl, ethyl, n-propyl, isopropyl, n-butyl, isobutyl, t-butyl, pentyl, amyl, hexyl and the like. The expression "conventional hydrolyzable ester or ether," as used herein, refers to those physiologically acceptable hydrolyzable ester and ether groups conventionally employed in the pharmaceutical art, preferably those of the unsubstituted or substituted hydrocarbon class containing up to 12 carbon atoms, inclusive, such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, adamantoate, and β-chloropropionate as esters and tetrahydrofuran-2-yloxy, tetrahydropyran-2-yloxy and 4-methoxytetrahydropyran-4-yloxy and ethers. The expression "carboxy" denotes the COOH group.

The wavy lines (⌇) at the C-1 position of the phenanthrene nucleus indicate the α or β configuration or mixtures thereof. Thus, the compounds of the present invention can exist in two d and two l forms, that is, d-cis, d-trans, l-cis, and l-trans. In addition, two racemates are possible, that is, dl-cis, and dl-trans. While each or mixtures are included within the scope hereof, the dl-cis racemate is preferred. The term "C–1α" refers to those compounds wherein the "$CH_2R^3$" group is in the alpha configuration or cis with respect to the $R^2$ group at the C–2 position.

For the purposes of the present invention, the conventional numbering of the various carbon positions on the phenanthrene nucleus is employed, as depicted by the following partial formula:

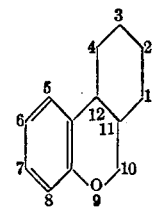

The compounds of the present invention possess estrogenic and anti-fertility activities and therefore are useful in replacement therapy for estrogen deficiencies, in the control and regulation of fertility and in the management of various menstrual disorders and are employed in accordance with these uses in the same manner as known estrogenic and anti-fertility agents. Thus, they can be administered in conjunction with one or more pharmaceutically non-toxic excipients, whether orally or parenterally, and at dosage levels appropriate for the condition being treated or effect desired, the most favorable dosage being determinable by one of ordinary skill in the art taking into consideration the particular condition being treated and the observed response to treatment. Useful pharmaceutical excipients, solid or liquid, include water, polyalkylene glycols, vegetable oils, lactose, talc, magnesium stearate, gelatin, starches, flavoring agents and the like. In general, the compounds of the present invention are used in the adopted manner customary with compounds having like utility.

The novel 9-oxa-polyhydrophenanthrene compounds of the present invention are prepared by the process illustrated by the following reaction sequence and the discussion which follows same:

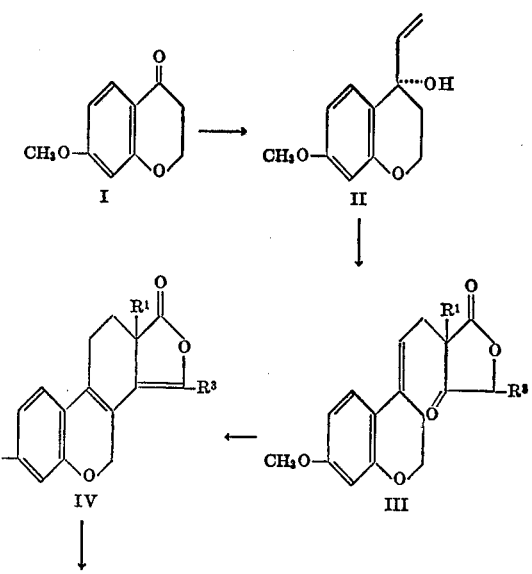

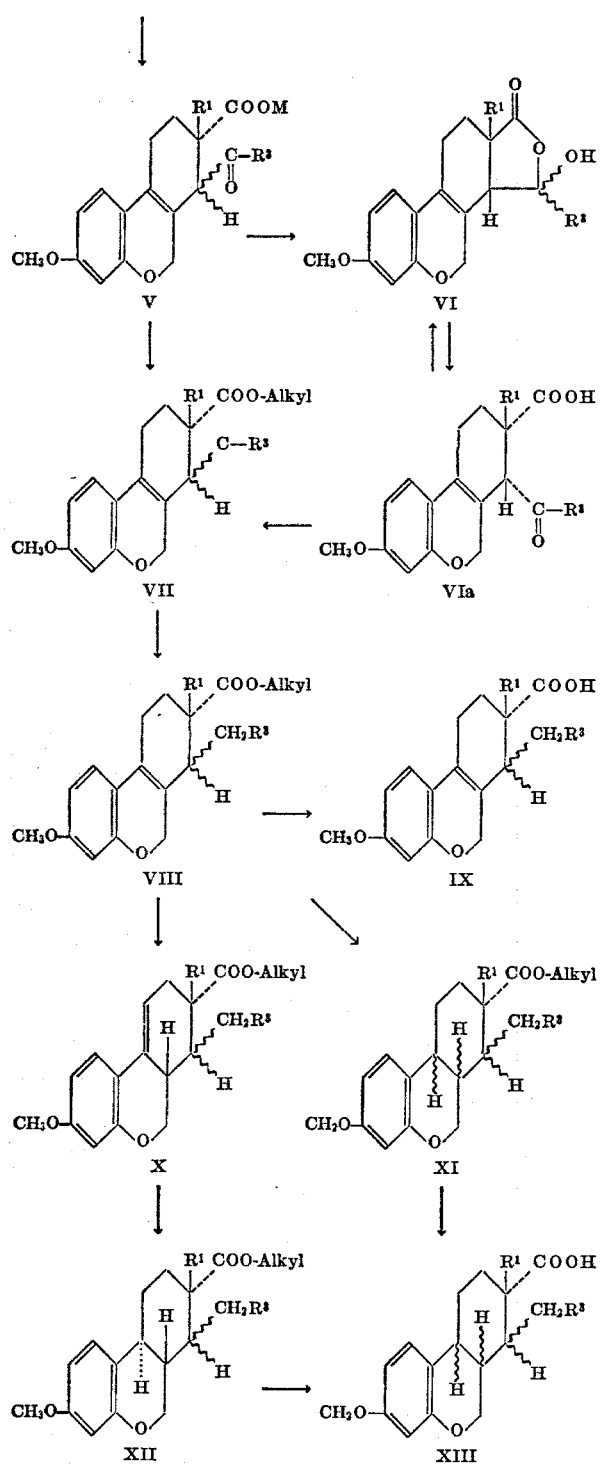

wherein R[1] and R[3] have the above-indicated meaning and M represents sodium or potassium.

For the sake of convenience and simplicity, the foregoing has been depicted with compounds having a C-7 methoxy group. Although the use of this group is preferred, it will be understood that other lower alkoxy or conventional hydrolyzable ethers can be attached in this position. Any of the corresponding intermediates can be isolated and hydrolyzed so as to prepare the corresponding hydroxy compounds and these can be esterified as desired to prepare the corresponding C-7 esters and ethers thereof.

In practicing the process outlined above, the starting material 7β-methoxychromanone (I) described for example by W. H. Perkin et al. J. Chem. Soc. 1927, 2094, is treated with a vinyl magnesium halide, such as vinyl magnesium bromide in an ether solvent, preferably using tetrahydrofuran as solvent, at reflux temperature, to give the vinylcarbinol, 1 - vinyl - 6-methoxy-4-oxa-1-tetralol (II). The vinyl carbinol is then condensed with a tetronic acid, of the class including α-monoalkyl substituted tetronic acids, and α,γ-dialkyl substituted tetronic acids, such as α-methyltetronic acid, α-ethyltetronic acid, α,γ-dimethyltetronic acid, and α - ethyl-γ-methyltetronic acid, in an aqueous solution of a water-miscible organic solvent such as methanol, ethanol, diethylene glycol monoethyl ether, diethylene glycol dimethyl ether, tetrahydrofuran, and the like, at about room temperature for a period of from about 30 minutes to 18 hours to afford a tricyclic compound of Formula III. Preferably, the condensation with the tetronic acid is effected at room temperature in aqueous ethanol for a period of about 1 hour.

A tricyclic compound of Formula III is then contacted with an acid, preferably a strong mineral or organic acid, either alone or in an organic solvent inert to the reaction such as benzene, xylene, dioxane, and the like at a temperature of from about room temperature to the reflux temperature of the solvent for a period of about 1 to 12 hours to form a tetracyclic enol lactone of Formula IV. Examples of suitable inorganic and organic acids for this reaction are p-toluenesulfonic acid, sulfosalicylic acid, anhydrous orthophosphoric acid, sulfuric acid, hydrochloric acid, formic acid, and the like. Preferably, this ring cyclization is effected by treatment with p-toluenesulfonic acid in benzene at reflux temperature for about four hours.

Upon reaction of the tetracyclic enol lactone of Formula IV, with an aqueous water miscible organic solvent solution of a base such as the alkali metal hydroxides, e.g. sodium hydroxide or potassium hydroxide, at about room temperature for a period of time of the order of about one to three hours, there is obtained the cis keto acid salt of Formula V. Suitable organic solvents include methanol, ethanol, dioxane, and the like. When the reaction of the enol lactone of Formula IV with a base in a miscible organic solvent is effected for a prolonged period time, i.e. for a period of time of the order of about 36 hours to about 48 hours followed by acidification there is obtained the trans keto acid of Formula V together with a minor amount of an equilibrium mixture of the cis lactol (VI).

The cis keto acid salt of Formula V is readily converted into the cis lactol of Formula VI by acid treatment. This lactol is in equilibrium with the free cis keto acid represented by Formula VIa.

Treatment of the keto acid salt (V), the lactol (VI) and its tautomeric form (VIa) with a lower alkyl halide, preferably a bromide or iodide, containing up to six carbon atoms, e.g. methyl iodide, methyl bromide, and the like, in an organic solvent such as dimethylacetamide or diethylformamide at about room temperature for from about 1 to about 10 hours, gives rise to the corresponding keto ester of Formula VII. This reaction is preferably effected in the presence of a base such as sodium carbonate.

A keto ester of Formula VII is then subjected to carbonyl reduction by chemical or electrochemical methods. Carbonyl reduction of the keto ester can be accomplished chemically by, for example, a Clemmensen reduction, or thioketal formation followed by treatment with Raney nickel. Thus, for example, a keto ester is reduced with amalgamated zinc and an acid such as hydrochloric acid, acetic acid or the like, to afford an ester of Formula VIII. Alternatively, a keto ester of Formula VII is treated with ethanedithiol at room temperature in the presence of boron trifluoride etherate, either alone or in an acetic acid solution, to afford a thioketal intermediate. Desulfurization of the latter intermediate with Raney nickel affords the ester (VIII).

In the electrochemical method, reduction of a keto ester of Formula VIII is effected at the cathode of a divided electrolysis cell in an electrolytic medium comprising a mineral acid electrolyte, water and a water-miscible inert organic solvent at a current density of about 0.01 to about 1.0 amps./cm.² and a temperature of from about 0° C. to about 70° C. for a period of about 1 to about 16 hours. Mineral acids suitable for the electrolytic medium are sulfuric acid, hydrochloric acid, perchloric acid, hydrobromic acid, phosphoric acid, and the like. Preferably, sulfuric acid or perchloric acid. Water-miscible organic solvents inert to the electrolysis reaction suitable for the electrolytic medium are ethers such as dioxane, tetrahydrofuran, and the like, lower monohydric alcohols such as methanol, ethanol, and the like, lower alkylene glycols such as ethylene glycol, propylene glycol, and the like, mixtures of the foregoing solvents, and the like in which the keto ester is soluble or substantially soluble.

The amount of solvent present in the electrolytic medium can range from about that amount which is sufficient to dissolve or substantially dissolve the keto ester up to about 94%, preferably from about 20% to about 85%, by weight, of the total electrolytic medium. The amount of acid in the medium can range from about 1% to about 20%, by weight, of the total electrolytic medium, preferably from about 2% to about 15%. The amount of water in the medium should be at least 5%, by weight, of the total electrolytic medium, preferably from about 10% to about 75%. A preferred medium is an equal volume of the inert organic solvent and an equal volume of 10% of 30% aqueous sulfuric acid, by weight.

Cathode materials useful in the process of the electrochemical reduction include the high hydrogen-over-voltage material such as lead, cadmium, mercury, and the like. The cathode may be in any number of physical forms but preferably in a form having a high surface such as a sheet or a wire mesh which is sufficiently rigid to be used as a stirring means. Anode materials useful for this reduction are difficultly oxidizable conductors such as carbon, platinum, iron, lead and the like. In general, the anode material may be a conductor which is not attacked by the electrolytic medium in a manner which would transform it into a soluble state over a short period.

In reducing the keto ester electrochemically, a current density of about 0.01 to about 1.0 amps./cm.², preferably from about 0.10 to about 1.0 can be used. Depending primarily upon the current efficiency of the system, reduction times of about 1 to about 16 hours are generally employed. A temperature within the range of about 5° C. to about 40° C. is preferred.

In the $R^3=$ hydrogen series, the keto ester of Formula VII, wherein $R^3$ is hydrogen, is preferably reduced with sodium borohydride to the 1-hydroxymethyl-2α-carboalkoxy derivative, which is converted into the 1-methyl-2α-carboxy compound by tosylation, treatment of the tosylate with lithium aluminum hydride and reoxidation of C-2, for example with chromic acid.

The ester of Formula VIII is then converted into the acid of Formula IX by hydrolysis. The conversion can be accomplished by treatment with 48% aqueous hydrobromic acid in acetic acid or with lithium iodide in collidine or lutidine solution. When the reaction time is extended to 24 hours or more, concomitant hydrolysis of the methoxy group at C-7 results.

The ester of Formula VIII is converted into the 11,12-dihydro compound of Formula XII by isomerizing the 11,12-double bond to the 4 position by acid treatment, for example by reaction with hydrochloric acid in ethanol solution. Thereafter, Compound X is subjected to catalytic hydrogenation, using 10% of palladium charcoal catalyst, in ethyl acetate-acetic acid solution to provide the desired 11β,12α-compound of Formula XII. Alternatively, the double bond at C-11,12 of Formula VIII can be reduced directly with metallic sodium or potassium in liquid ammonia in the presence of aniline, to give Compound XI. By this method, the other possible trans and cis isomers are prepared, hence the use of the wavy line at positions C-11,12 (Formula XI).

Alkaline hydrolysis of the ester of Formulas XI and XII followed by acidification yields the corresponding acid of Formula XIII. This reaction can be effected by treatment with an alkali metal hydroxide such as sodium hydroxide or potassium hydroxide in methanol or ethanol at an elevated temperature, e.g. at a temperature of approximately 180° C. of a few minutes to several hours, for example from about 30 minutes to about four hours or more followed by acidification with an organic or inorganic acid using, for example, an aqueous solution of hydrochloric acid. Alternatively, said hydrolysis can be carried out by reaction with 48% hydrobromic acid or with lithium iodide in collidine, with concomitant hydrolysis of the 7-methoxy group.

The phenanthrene-2-carboxylic acids described herein are obtained in the form of their dl-mixtures which can be resolved, if desired, by methods known in the art. For example, the acids form salts with optically active amines such as brucine, cinchonine, methylamine, morphine, quinidine, quinine and strychnine. Fractional crystallization of the resulting diasteroisomeric salts followed by regeneration of the free acids affords the individual d and l enanthiomorphs.

The carboalkyloxy group in the esters of Formulas VIII, XI and XII can be reduced, for example with lithium aluminum hydride in an inert solvent such as diethyl ether or tetrahydrofuran, to produce the corresponding 2α-hydroxymethyl derivatives which, upon oxidation, for example with chromium trioxide in pyridine or by treatment with N,N'-dicyclohexylcarbodiimide in dimethylsulfoxide solution and in the presence of acid produces the corresponding 2α-formyl compound. This transformation can be illustrated as follows:

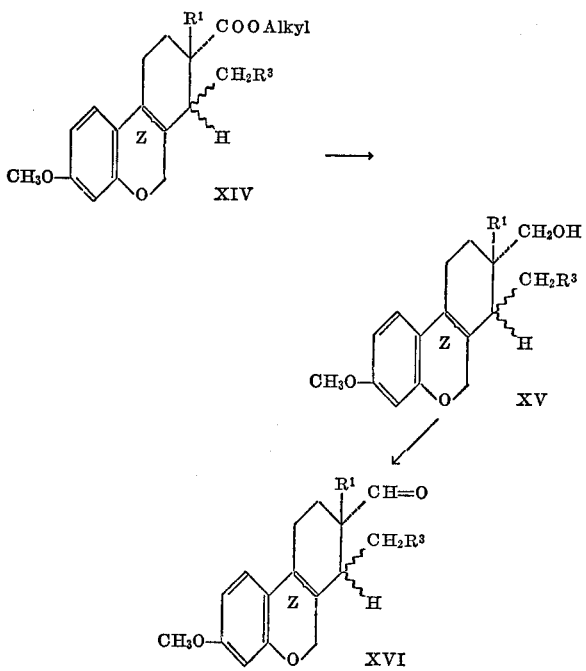

wherein $R^1$, $R^3$, and Z have the same meaning as set forth above.

The 7-methoxy group in the 9-oxa-polyhydrophenanthrene compounds obtained by the above described processes, or their intermediates as discussed above, can be hydrolyzed by methods known to the skilled in the art, for example with 48% hydrobromic acid in acetic acid, and the 7-hydroxy compounds can be esterified with carboxylic acid anhydrides of less than 12 carbon atoms to the corresponding 7-acyloxy derivatives or etherified with dihydrofuran, dihydropyran, or 4-methoxy-5,6-dihydro-2H-pyran, preferably in p-toluenesulfonic acid catalyst.

In the case of the 2α-hydroxymethyl compounds there are obtained the diesters and diethers. Alternatively, the 7-hydroxy group can be reetherified, as described above, for example, by treatment with an alkanol in the presence of an acid catalyst, or with a dialkylsulfate in acetone solution and in the presence of base.

The carboxy group can be esterified with an alkyl halide, as previously described, or with a diazoalkane.

The compounds represented by Formulas III, IV, V, VI, VIa, and VII are novel and are intermediates useful for preparing the products of Formula A as described herein. In accordance with the spirit of the present invention, those intermediates corresponding to Formulas III, IV, V, VI, VIa, and VII containing hydroxy or conventional hydrolyzable ester or ether at C–7 are included within the scope of these useful intermediate compounds. As described herein, these corresponding intermediates are prepared by starting with the appropriate C–7 substituted compounds or by interrupting the process, hydrolyzing the C–7 methoxy group and, if desired, re-etherifying or esterifying the hydroxyl thus produced.

The following examples will serve to further typify the nature of this invention but should not be construed as a limitation on the scope thereof.

EXAMPLE 1

To a suspension of 6 g. of magnesium activated by a trace of iodine, in 50 ml. of absolute tetrahydrofuran there is added with heating at 30° C. and under a nitrogen atmosphere a mixture of 33 g. of fresh vinyl bromide in 30 ml. of anhydrous tetrahydrofuran. The reaction starts after addition of 20% vinyl bromide and the mixture is then cooled. The rest of vinyl bromide is added over a 20 minute period; the reaction mixture is then refluxed for 30 minutes, and thereafter cooled to −20° C., diluted with 20 ml. of ether and treated with a solution of 12 g. of 7-methoxychromanone in 70 ml. of anhydrous tetrahydrofuran previously cooled to −15° C. The reaction mixture is stirred at this temperature for 3 hours, and then allowed to stand at room temperature for 18 hours. The resulting suspension is then refluxed for 2 hours, cooled and poured into iced ammonium chloride solution. The organic layer is separated and the aqueous layer extracted several times with ether. The organic extracts are washed with water to neutrality, dried over sodium sulfate and evaporated to dryness, to give the crude 1-vinyl-6-methoxy-4-oxa-1-tetralol.

EXAMPLE 2

To a well-stirred solution of 16.8 g. of ethyl α-propionyl propionate in 100 ml. of anhydrous ether is added dropwise 17 g. of bromine at such a rate that the solution continually remains clear. After completion of the bromine addition, stirring is maintained for an additional two hours. At the end of the reaction time, the ether is evaporated under reduced pressure and the resulting oil is then dissolved in 65 ml. of xylene, and the resulting xylene mixture is refluxed for 17 hours. The xylene mixture is allowed to cool and then concentrated to a smaller volume and upon cooling deposits a precipitate of α,γ-dimethyl tetronic acid which is collected by filtration and recrystallized from benzene:hexane.

To a solution of 3 g. of 1-vinyl-6-methoxy-4-oxo-1-tetralol in a mixture of 20 ml. of ethanol and 20 ml. of water, there is added a solution of 1.5 g. α,γ-dimethyltetronic acid in 10 ml. of ethanol and the reaction mixture allowed to stand at room temperature for 1 hour. The reaction mixture is then poured into water, and extracted several times with methylene chloride. The combined organic extracts are washed with water, dried over sodium sulfate and evaporated to dryness under reduced pressure, to give 3-methoxy-15-methyl-6,16-dioxa-8(14)-seco-estra-1,3,5(10),9,(11)-tetraene-14,17-dione, which is purified by preparative thin-layer chromatography.

By the same method but using α-methyltetronic acid, α-ethyltetronic acid and α-ethyl-γ-methyl-tetronic acid is used in lieu of α,γ-dimethyltetronic acid there are obtained 3-methoxy - 6,16 - dioxa-8(14)-secoestra-1,3,5(10),9(11)-tetraene - 14,17 - dione, 3-methoxy-18-methyl-6,16-dioxa-8(14)-secoestra - 1,3,5(10),9(11) - tetraene-14,17-dione and 3 - methoxy-15,18-dimethyl-6,16-dioxa-8(14)-seco-estra-1,3,5(10),9(11)-tetraene-14,17-dione, respectively.

EXAMPLE 3

A mixture of 7 g. of 3-methoxy-15-methyl-6,16-dioxa-8(14)-secoestra - 1,3,5(10),9(11) - tetraene-14,17-dione, 0.5 g. of p-toluenesulfonic acid and 120 ml. of benzene is refluxed for 4 hours, using a Dean Stark trap to remove water formed during the reaction. The reaction mixture is then concentrated under reduced pressure, and the residue purified by preparative T.L.C. to afford 3-methoxy-15-methyl-6,16-dioxaestra - 1,3,5(10),8,14 - pentaen-17-one, which is recrystallized from ether.

EXAMPLE 4

A solution of 3.9 g. of 3-methoxy-15-methyl-6,16-dioxaestra-1,3,5(10),8,14-pentaen-17-one in 400 ml. of ethanol is treated with 160 ml. of 1 N aqueous sodium hydroxide solution. The reaction mixture is maintained at room temperature for 3 hours under vigorous stirring, and then poured into water and acidified with dilute hydrochloric acid solution. The product is then extracted with ethyl acetate, and the combined organic extracts washed with water, dried over sodium sulfate and purified by preparative T.L.C., thus producing 3-methoxy-15-methyl-15-hydroxy - 6,16 - dioxa - 14β-estra-1,3,5(10),8-tetraen-17-one. The 15β-methyl-15α-hydroxy isomer predominates.

EXAMPLE 5

A solution of 1 g. of 3-methoxy-15-methyl-15-hydroxy-6,16-dioxa-14β-estra-1,3,5(10),8-tetraen-17-one in 54 ml. of N,N-dimethylacetamide is treated with 0.4 ml. of methyl iodide and 0.5 g. of sodium carbonate, and the reaction mixture is stirred at room temperature (25° C.) for 16 hours. Water is then added, the resulting solution is saturated with sodium chloride and extracted several times with ether; the combined organic extracts are washed with water, 5% aqueous thiosulfate solution, dried and evaporated to dryness under reduced pressure to yield the methyl ester of cis-7-methoxy-1-acetyl-2-methyl-9-oxa-1,2,3,4-tetrahydrophenanthrene-2-carboxylic acid.

EXAMPLE 6

Into a cathode compartment of a divided electrolysis cell provided with a cellulose dialysis membrane, lead electrodes (each electrode measuring 2 cm. x 5 cm. x 1.6 mm.) and a stirrer, there is added 270 mg. of the methyl ester of cis 7-methoxy-1-acetyl-2-methyl-9-oxa-1,2,3,4-tetrahydrophenanthrene-2-carboxylic acid and a mixture of 40 ml. of dioxane and 40 ml. of 10% aqueous sulfuric acid (by weight). An additional amount of a mixture of 40 ml. of dioxane and 40 ml. of 10% aqueous sulfuric acid is added to the other compartment. A current density of about 1 amp./cm.² is applied for a period of three hours. The reaction mixture is then removed from the cell and concentrated under reduced pressure to a small volume which is then extracted several times with ether. The ether extracts are combined, washed with water and a 5% aqueous sodium bicarbonate solution, dried and evaporated to dryness to furnish the methyl ester of cis 7-methoxy-1-ethyl-2-methyl-9-oxa-1,2,3,4-tetrahydrophenanthrene-2-carboxylic acid.

EXAMPLE 7

The method of Examples 3, 4, 5 and 6 are repeated using 3-methoxy 15,18-dimethyl-6,16-dioxa-8(14)seco-estra-1,3,5(10),9(11)-tetraene-14,17-dione as starting material thus producing successively: 3-methoxy-15,18-dimethyl-6,16-dioxaestra - 1,3,5(10),8,14 - pentaen-17-one, 3-methoxy - 15,18 - dimethyl-15-hydroxy-6,16-dioxa-14β-estra-1,3,5(10),8-tetraen-17-one, the methyl ester of cis-7- methoxy-1-acetyl-2-ethyl-9-oxa - 1,2,3,4 - tetrahydrophenanthrene-2-carboxylic acid and the methyl ester of cis-7-methoxy - 1,2 - diethyl - 9 - oxa - 1,2,3,4 - tetrahydrophenanthrene-2-carboxylic acid.

Similarly, by employing 3-methoxy-6,16-dioxa-8(14)-secoestra - 1,3,5(10),9(11) - tetraene-14,17-dione and 3-methoxy-18-methyldioxa - 8(14) - secoestra - 1,3,5(10),9(11)-tetraene-14,17-dione in these procedures there are respectively obtained the respective products methyl ester of cis-7-methoxy-1,2-dimethyl-9-oxa-1,2,3,4 - tetrahydrophenanthrene-2-carboxylic and methyl ester of cis-7-methoxy-1-methyl-2-ethyl-9-oxa-1,2,3,4 - tetrahydrophenanthrene-2-carboxylic acid.

EXAMPLE 8

A mixture of 5 g. of the methyl ester of cis-7-methoxy-1-acetyl-2-methyl-9-oxa-1,2,3,4 - tetrahydrophenanthrene-2-carboxylic acid in 100 ml. of glacial acetic acid, 5 ml. of 1,2-ethanedithiol and 4 ml. of acetic acid, which has been previously saturated with anhydrous hydrogen chloride, is held at room temperature for four hours. The reaction mixture is then poured into water and extracted with several portions of ether. The organic phase is separated, dried and evaporated to dryness under reduced pressure. The residue is recrystallized from ethyl acetate:hexane to afford the methyl ester of cis-7-methoxy-1',1'-ethylenedithioxyethyl-2-methyl-9-oxa-1,2,3,4 - tetrahydrophenanthrene-2-carboxylic acid. A mixture of 2 g. of the foregoing compound, 20 g. of Raney nickel and 60 ml. of methanol, previously distilled over Raney nickel, is heated at reflux for 24 hours. The catalyst is removed by filtration, washed with methanol and the filtrate evaporated to dryness under reduced pressure. The residue is dissolved in chloroform. The chloroform solution is washed with dilute hydrochloric acid, aqueous 5% sodium carbonate solution and water, and then dried and evaporated to dryness to yield the methyl ester of cis-7-methoxy-1-ethyl-2-methyl-9-oxa-1,2,3,4 - tetrahydrophenanthrene-2-carboxylic acid, which is purified by recrystallization from acetone:hexane, identical to that obtained in Example 6.

Also thus prepared are the methyl esters of cis-7-methoxy-1,2-dimethyl-9-oxa-1,2,3,4 - tetrahydrophenanthrene-2-carboxylic acid and cis-7-methoxy-1-methyl-2-ethyl-9-oxa-1,2,3,4-tetrahydrophenanthrene-2-carboxylic acid.

EXAMPLE 9

To a mixture of 1 g. of the methyl ester of cis 7-methoxy-1-ethyl-2-methyl-9-oxa - 1,2,3,4 - tetrahydrophenanthrene-2-carboxylic acid and 125 ml. of liquid ammonia is added 0.5 g. of metallic potassium and 7 ml. of aniline. The resulting mixture is stirred for about 1.5 hours. About 2 grams of ammonium chloride is then added with stirring. Then, the reaction mixture is allowed to stand until the ammonia has evaporated. The residue is taken up in water: methylene chloride. The resulting mixture is separated and the aqueous layer is extracted with methylene chloride. The methylene chloride layer and methylene chloride extract are combined, dried and evaporated to dryness. The residue is purified by t.l.c. to furnish the methyl ester of cis 7-methoxy-1-ethyl-2-methyl-9 - oxa-1,2,3,4-11$\beta$,12$\alpha$-hexahydrophenanthrene-2-carboxylic acid as well corresponding 11$\alpha$,12$\beta$,11$\alpha$,12$\alpha$, and 11$\beta$, 12$\beta$ compounds.

EXAMPLE 10

A solution of 1 g. of the methyl ester of cis 7-methoxy-1-ethyl-2-methyl-9-oxa - 1,2,3,4 - tetrahydrophenanthrene-2-carboxylic acid in 25 ml. of ethanol is treated with 1 ml. of concentrated hydrochloric acid, and the mixture is allowed to stand at room temperature for 16 hours. Water is then added, and the product isolated by extraction with methylene chloride. The organic extract is washed with sodium carbonate solution and water to neutrality, dried over sodium sulfate and evaporated to dryness under vacuo. Thin layer chromatography of the residue affords the methyl ester of cis 7-methoxy-1-ethyl-2-methyl-9-oxa - 1,2,3,11$\beta$ - tetrahydrophenanthrene-2-carboxylic acid.

A solution of 200 mg. of the latter compound in 20 ml. of 1:1 mixture of ethylacetate:acetic acid is added to 50 mg. of 10% palladium charcoal catalyst in 5 ml. of the ethylacetate-acetic acid mixture which has been prehydrogenated. The reaction mixture is stirred under a hydrogen atmosphere until 1 molar equivalent of hydrogen is absorbed. The catalyst is removed by filtration and the filtrate is evaporated to dryness. Crystallization of the residue from methylene chloride-hexane affords the methyl ester of cis 7-methoxy-1-ethyl-2-methyl-9-oxa-1,2,3,4,11$\beta$, 12$\alpha$-hexahydrophenanthrene-2-carboxylic acid, identical to that obtained in Example 9.

EXAMPLE 11

A mixture of 190 mg. of the methyl ester of cis 7-methoxy-1-ethyl-2-methyl - 9 - oxa-1,2,3,4-tetrahydrophenanthrene-2-carboxylic acid, 10 ml. of collidine and 380 mg. of lithium iodide previously dried at 300° C. is refluxed for 10 hours under a nitrogen atmosphere. The reaction mixture is then cooled and poured into iced 2 N hydrochloric acid solution. The mixture is extracted several times with methylene chloride and the combined organic extracts washed twice with 2 N hydrochloric acid solution and finally with water to neutrality, dried over sodium sulfate and evaporated to dryness under vacuo. The residue is purified by thin layer chromatography, to produce the cis-7-methoxy-1-ethyl - 2 - methyl-9-oxa-1,2,3,4-tetrahydrophenanthrene-2-carboxylic acid, and a small amount of cis 7-hydroxy-1-ethyl-2-methyl-9-oxa-1,2,3,4-tetrahydrophenanthrene-2-carboxylic acid.

When the reaction time is extended to 30 hours the major product is cis 7-hydroxy-1-ethyl-2-methyl-9-oxa-1,2,3,4-tetrahydrophenanthrene-2-carboxylic acid.

EXAMPLE 12

A solution of 1 g. of the methyl ester of cis 7-methoxy-1-ethyl-2-methyl-9-oxa - 1,2,3,4,11,12 - hexahydrophenanthrene-2-carboxylic acid in 10 ml. of glacial acetic acid is saturated with gaseous hydrogen bromide and the mixture allowed to stand for 18 hours at room temperature. Water is then added and the product isolated by ethyl acetate extraction. The combined organic extracts are washed with water to neutrality, dried over sodium sulfate and evaporated to dryness under reduced pressure. Crystallization of the residue from acetone-hexane gives the methyl ester of cis 7-hydroxy-1-ethyl-2-methyl-9-oxa-1,2,3,4,11,12-hexahydrophenanthrene-2-carboxylic acid.

In a similar manner, but using the methyl ester of cis 7 - methoxy-1-ethyl-2-methyl-9-oxa - 1,2,3,4 - tetrahydrophenanthrene-2-carboxylic acid as starting material there is obtained the methyl ester of cis 7-hydroxy-1-ethyl-2-methyl-9-oxa-1,2,3,4-tetrahydrophenanthrene - 2 - carboxylic acid.

EXAMPLE 13

A mixture of 2 g. of the methyl ester of cis 7-methoxy-1-ethyl-2-methyl-9-oxa - 1,2,3,4,11,12 - hexahydrophenanthrene-2-carboxylic acid, 20 ml. of glacial acetic acid and 0.5 ml. of 48% aqueous hydrobromic acid is refluxed for 48 hours. The reaction mixture is diluted with water and extracted with methylene chloride. The extracts are combined, washed with water, dried over sodium sulfate and evaporated to dryness to yield cis 7-hydroxy-1-ethyl-2-methyl-9-oxa - 1,2,3,4,11,12 - hexahydrophenanthrene-2-carboxylic acid.

EXAMPLE 14

A mixture of 330 mg. of the methyl ester of cis 7-methoxy-1-ethyl-2-methyl-9-oxa - 1,2,3,4,11,12 - hexahydrophenanthrene-2-carboxylic acid, 3.5 g. of potassium hydroxide, 7 ml. of ethanol and 7 ml. of water is heated in a sealed tube at about 180° C. for 45 minutes. The reaction mixture is allowed to cool and is then poured into water. The resulting mixture is acidified with hydrochloric acid solution and extracted several times with ethyl acetate. The combined organic extracts are dried and evaporated to dryness, to furnish cis 7-methoxy-1-ethyl-2-methyl-9-oxa - 1,2,3,4,11,12 - hexahydrophenanthrene-2-carboxylic acid.

Similarly, starting from the methyl ester of cis 7-methoxy-1,2-diethyl-9-oxa - 1,2,3,4,11,12 - hexahydrophenanthrene-2-carboxylic acid and cis 7-methoxy-1-methyl-2-ethyl-9-oxa - 1,2,3,4,11,12 - hexahydrophenanthrene-2-carboxylic acid, there is respectively obtained cis 7-methoxy-1,2-diethyl-9-oxa - 1,2,3,4,11,12 - hexahydrophenanthrene-2-carboxylic acid and cis 7-methoxy-1-methyl-2-ethyl-9-oxa-1,2,3,4-11,12-hexahydrophenanthrene - 2 - carboxylic acid.

EXAMPLE 15

A mixture of 670 mg. of 3-methoxy-15-methyl-6,16-dioxaestra-1,3,5(10),8,14-pentaen-17-one in 70 ml. of dioxane and 45 ml. of 0.1 N aqueous sodium hydroxide is allowed to stand at 20° C. for 36 hours. The solvents are then removed by evaporation under reduced pressure. The resulting residue is diluted with water and acidified by adding diluted hydrochloric acid. This aqueous mixture is extracted several times with ether. The ether extracts are combined and then evaporated to dryness to yield an oil containing a mixture of trans 7-methoxy-1-acetyl-2-methyl-9-oxa-1,2,3,4-tetrahydrophenanthrene-2-carboxylic acid and 3-methoxy-15-methyl-15-hydroxy-6,16-dioxa-14β-estra 1,3,5(10),8-tetraen-17-one. The oil is recrystallized from benzene:hexane to yield the trans acid as the first-crop. Upon concentration of the mother liquors, the 3-methoxy-15 - methyl-15-hydroxy-6,16-dioxa-14β-estra-1,3,5(10),8-tetraen-17-one, identical to that of Example 4 is obtained.

Subjecting the trans - 7 - methoxy-1-acetyl-2-methyl-9-oxa-1,2,3,4-tetrahydrophenanthrene-2-carboxylic acid to the esterification, carbonyl reduction and hydrogenation methods described in Examples 5, 6 and 9 there are successively obtained the methyl ester of trans 7-methoxy-1-acetyl - 2 - methyl-9-oxa-1,2,3,4-tetrahydrophenanthrene-2-carboxylic acid, the methyl ester of trans 7-methoxy-1-ethyl - 2 - methyl-9-oxa-1,2,3,4-tetrahydrophenanthrene-2-carboxylic acid and the methyl ester of trans 7-methoxy - 1 - ethyl-2-methyl-9-oxa-1,2,3,4,11,12-hexahydrophenanthrene-2-carboxylic acid.

By starting with the corresponding trans isomers of 3-methoxy - 6,16 - dioxaestra - 1,3,5(10),8,14-pentaen-17-one, 3 - methoxy - 18-methyl-6,16-dioxaestra-1,3,5(10), 8,14-pentaen-17-one, and 3-methoxy-15,18-dimethyl-6,16-dioxaestra-1,3,5(10),8,14 - pentaen - 17 - one, there is respectfully obtained (successively) the methyl ester of trans 7 - methoxy - 1 formyl - 2-methyl-9-oxo-1,2,3,4-tetrahydrophenanthrene-2-carboxylic acid, the methyl ester of trans 7-methoxy-1-formyl-2-ethyl-9-oxo-1,2,3,4-tetrahydrophenanthrene-2-carboxylic acid; the methyl ester of trans 7 - methoxy - 1-acetyl-2-ethyl-9-oxa-1,2,3,4-tetrahydrophenanthrene-2-carboxylic acid and the methyl ester of trans 7-methoxy-1,2-dimethyl-9-oxa-1,2,3,4-tetrahydrophenanthrene-2-carboxylic acid, and the methyl ester of trans 7-methoxy-1-methyl-2-ethyl-9-oxa-1,2,3,4-tetrahydrophenanthrene-2-carboxylic acid, and the methyl ester of trans 7-methoxy-1,2-diethyl-9-oxa-1,2,3,4-tetrahydrophenanthrene-2-carboxylic acid; and the methyl ester of trans 7-methoxy-1,2-dimethyl-9-oxa-1,2,3,4,11,12-hexahydrophenanthrene-2-carboxylic, the methyl ester of trans 7 - methoxy - 1-methyl-2-ethyl-9-oxa-1,2,3,4,11,12-hexahydrophenanthrene-2-carboxylic, and the methyl ester of trans 7-methoxy-1,2-diethyl-9-oxa-1,2,3,4,11,12-hexahydrophenanthrene-2-carboxylic acid.

EXAMPLE 16

A mixture of 1 g. of the methyl ester of cis 7-methoxy-1 - ethyl-2-methyl-9-oxa-1,2,3,4-tetrahydrophenanthrene-2-carboxylic acid in 20 ml. of anhydrous tetrahydrofuran is cooled to −75° C. in a Dry Ice-acetone bath and treated with a previously cooled solution of 0.6 g. of lithium aluminum hydride in 20 ml. of anhydrous tetrahydrofuran. The reaction mixture is then allowed to warm to room temperature and is then heated at reflux for 15 minutes. The reaction mixture is then cooled and cautiously treated with 5 cc. of ethyl acetate and 2 cc. of water; saturated solution or sodium sulfate and solid sodium sulfate are added, the inorganic material filtered off and thoroughly washed with hot ethyl acetate. The combined organic solutions are evaporated to dryness, to yield cis 7-methoxy-1-ethyl-2-hydroxymethyl-2-methyl-9-oxa - 1,2,3,4 - tetrahydrophenanthrene, which may be further purified by recrystallization from acetone-hexane.

By repeating the above process using as the starting material the other phenanthrene-2-carboxylic acids methyl ester of the present invention, the corresponding 2-hydroxymethyl compounds are obtained. Thus for example starting from the methyl ester of trans 7-methoxy-1 - ethyl - 2 - methyl - 9 oxa - 1,2,3,4,11β,12α-hexahydrophenanthrene-2-carboxylic acid there is obtained trans 7 - methoxy - 1 - ethyl - 2 - hydroxy-methyl-2-methyl-9-oxa - 1,2,3,4,11β,12α-hexahydrophenanthrene.

EXAMPLE 17

To a solution of 1 g. of trans 7-methoxy-1,2-diethyl-2 - hydroxymethyl - 9 - oxo - 1,2,3,4 - tetrahydrophenanthrene in 25 ml. of pyridine, previously cooled to 0° C. there is added dropwise a cooled solution (0° C.) of 1 g. of chromium trioxide in 25 ml. of pyridine. The resulting reaction mixture is held at 0° C. for a period of 24 hours, diluted with ethyl acetate and filtered through diatomaceous earth. The filtrate is washed with water, dried and evaporated to yield trans 7-methoxy-1,2-diethyl-2-formyl-9-oxa-1,2,3,4-tetrahydrophenanthrene which can be recrystallized from actone:hexane.

In a similar manner, the other 2-hydroxymethyl compounds of the present invention can be converted into the corresponding 2-formyl compounds.

EXAMPLE 18

A mixture of 1 g. of cis 7-hydroxy-1,2-dimethyl-9-oxa-1,2,3,4,11,12 - hexahydrophenanthrene - 2 - carboxylic acid, 4 ml. of pyridine and 4 ml. of acetic anhydride is allowed to stand at room temperature for 15 hours. The mixture is then poured into ice water and the solid which forms is collected by filtration, washed with water and dried to yield cis 7-acetoxy-1,2-dimethyl-9-oxa-1,2,3,4,11, 12-hexahydrophenanthrene-2-carboxylic acid.

Similarly, by using an equivalent amount of other lower carboxylic anhydrides in place of acetic anhydride, for example, propionic anhydride, n-butyric anhydride, n-caproic anhydride, trimethylacetic anhydride and the like, the corresponding ester is obtained.

To a solution of 500 mg. of cis 7-acetoxy-1-ethyl-2-methyl - 9 - oxa-1,2,3,4,11β,12α-hexahydrophenanthrene-2-carboxylic acid in 20 ml. of ether there is added an excess of an ethereal solution of diazomethane, and the mixture is kept at room temperature for 18 hours. The excess reagent is decomposed by the addition of acetic acid; the reaction mixture is then washed with water to neutrality, dried over sodium sulfate and evaporated to dryness under vacuo, to yield the methyl ester of cis 7-acetoxy-1-ethyl-2 - methyl - 1,2,3,4,11β,12α-hexahydrophenanthrene-2-carboxylic acid.

EXAMPLE 19

By following the method described in Example 12, 1 g. of trans 7-methoxy-1-ethyl-2-methyl-2-hydroxymethyl-9-oxa - 1,2,3,4 - tetrahydrophenanthrene is converted into trans 7 - hydroxy - 1 - ethyl-2-methyl-2-hydroxymethyl-9-oxa-1,2,3,4-tetrahydrophenanthrene. Esterification of the foregoing compound with acetic anhydride in pyridine, in accordance with the method of Example 18 yields trans 7 - hydroxy - 1-ethyl-2-methylq-2-hydroxymethyl-9-oxa-1,2,3,4-tetrahydrophenanthrene.

Similarly, by using propionic anhyride, valeric anhydride and cyclopentylpropionic anhydride in lieu of acetic anhydride, there are obtained the corresponding diesters of trans 7-hydroxyl-1-ethyl-2-methyl-2-hydroxymethyl-9-oxa-1,2,3,4-tetrahydrophenanthrene.

EXAMPLE 20

To a solution of 2 g. of cis 7-methoxy-1,2-diethyl-9-oxa - 1,2,3,4,11β,12α - hexahydrophenanthrene - 2-carboxylic acid in 50 ml. of diethyl ether there is slowly added a solution of 5 g. of diazaethane in 5 ml. of diethyl ether. The reaction mixture is allowed to stand at room temperature for 30 minutes, a few drops of acetic acid are added to destroy the excess diazoethane and the mixture is then evaporated to dryness under reduced pressure to yield the ethyl ester of cis 7-methoxy-1,2-diethyl-9-oxa-1,2,3,4,11β,12α - hexahydrophenanthrene - 2 - carboxylic acid. By replacing diazoethane with diazopropane in the above process the propyl ester of cis 7-methoxy-1,2-diethyl - 9 - oxa - 1,2,3,4,11β,12α-hexahydrophenanthrene-2-carboxylic acid is obtained.

By means of the above described process, the other 2-carboxylic acids of the present invention are converted into the corresponding ethyl and propyl esters.

EXAMPLE 21

Two milliliters of dihydrofuran are added to a solution of 1 g. of trans 7-hydroxy-1-methyl-2-ethyl-9-oxa-1,2,3,4,11,12-hexahydrophenanthrene-2-carboxylic acid in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield trans 7-tetrahydrofuran-2'-yloxy-1-methyl-2 - ethyl-9-oxa - 1,2,3,4,11,12-hexahydrophenanthrene-2-carboxylic acid which is recrystallized from pentane.

The foregoing process when repeated using dihydropyran and 4-methoxy-5,6-dihydro-2H-pyran in lieu of dihydrofuran affords the corresponding tetrahydropyran-2-yloxy and 4-methoxytetrahydropyran-4-yloxy ethers, respectively.

The foregoing when practiced upon the 7-hydroxy-2-hydroxymethyl compounds affords the corresponding diethers.

The foregoing when practiced upon the other 7-hydroxy and 7-hydroxy-2-hydroxymethyl compounds hereof affords the corresponding monoether and diether compounds.

The intermediate 7-methoxy compounds of the foregoing examples can be hydrolyzed, as described in Example 11 or 12, to prepare the corresponding 7-hydroxy compound and it can be esterified or etherified as set forth in Examples 18, 19, and 21 to prepare the corresponding C-7 esters and ethers thereof.

EXAMPLE 22

A solution of 2 g. of sodium borohydride in 30 ml. of methanol is added with stirring to a solution of 2 g. of the methyl ester of 7-methoxy-1-formyl-2-methyl-9-oxa-1,2,3,4-tetrahydrophenanthrene-2-carboxylic acid in 40 ml. of tetrahydrofuran. The mixture is allowed to stand at room temperature for 15 hours and the excess reagent is then decomposed by the addition of acetic acid. The mixture is next concentrated to small volume under reduced pressure, diluted with water and extracted with ethyl acetate. These extracts are washed with water, dried and evaporated to yield the methyl ester of 7-methoxy-1-hydroxymethyl-2-methyl-9-oxa - 1,2,3,4 - tetrahydrophenanthrene-2-carboxylic acid which is further purified through recrystallization from acetone:hexane.

A mixture of 1 g. of the methyl ester of 7-methoxy-1-hydroxymethyl-2-methyl-9-oxa - 1,2,3,4 - tetrahydrophenanthrene-2-carboxylic acid in 5 ml. of pyridine and 0.5 g. of p-toluenesulfonyl chloride is allowed to stand at room temperature for 24 hours and is then diluted with water and filtered. The solid thus collected is dried and recrystallized from acetone:hexane to yield the methyl ester of 7-methoxy-1-(p-toluenesulfonyloxy)-2-methyl-9-oxa - 1,2,3,4 - tetrahydrophenanthrene-2-carboxylic acid.

A solution of 1 g. of the methyl ester of 7-methoxy-1-(p-toluenesulfonyloxy)-2-methyl - 9 - oxa-1,2,3,4-tetrahydrophenanthrene-2-carboxylic acid in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 7-methoxy-1,2-dimethyl - 2 - hydroxymethyl-9-oxa-1,2,3,4-tetrahydrophenanthrene.

A solution of 6 g. of 7-methoxy-1,2-dimethyl-2-hydroxymethyl-9-oxa-1,2,3,4-tetrahydrophenanthrene in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 7-methoxy-1,2-dimethyl-9-oxa - 1,2,3,4 - tetrahydrophenanthrene-2-carboxylic acid which may be further purified by recrystallization from acetone:hexane.

The procedure can be used for the preparation of the other C-1 methyl compounds in the present invention from the corresponding C-1 formyl compounds. The product acids can be esterified or otherwise modified as set forth by the procedures above so as to prepare, for example, the methyl ester of 7-methoxy-1,2-dimethyl-9-oxa-1,2,3,4-tetrahydrophenanthrene-2-carboxylic acid.

What is claimed is:

1. A compound selected from the group of compounds represented by the following formula:

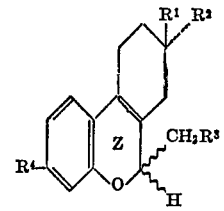

wherein:

$R^1$ is methyl or ethyl;

$R^2$ is carboxy, carb(lower)alkyloxy, formyl, hydroxymethyl, a hydrolyzable hydrocarbon carboxylic acyloxymethyl radical wherein the acyloxy moiety has 1 to 12 carbon atoms, a lower alkyloxymethyl radical wherein the lower alkyloxy moiety has 1–6 carbon atoms, tetrahydrofuran-2 - yloxymethyl, tetrahydropyran-2-yloxymethyl, or 4-methoxytetrahydropyran-4-yloxymethyl;

$R^3$ is hydrogen or methyl;

$R^4$ is hydroxy, lower alkyloxy wherein the alkyloxy moiety has 1–6 carbon atoms, a hydrolyzable hydrocarbon carboxylic acyloxy radical wherein the acyloxy moiety has 1 to 12 carbon atoms, tetrahydrofuran-2-yloxy, tetrahydropyran-2-yloxy, or 4-methoxytetrahydropyran-2-yloxy; and Z is a carbon-carbon single bond or a carbon-carbon double bond.

2. A compound according to claim 1 wherein $R^1$ is methyl and $R^3$ is methyl.

3. A compound according to claim 2 wherein $R^4$ is methoxy.

4. A C–1α compound according to claim 3.

5. A compound according to claim 1 wherein Z is a carbon-carbon single bond.

6. A compound according to claim 5 wherein $R^1$ is methyl, $R^2$ is carboxy, $R^3$ is methyl and $R^4$ is methoxy.

7. A compound according to claim 5 wherein $R^1$ is methyl, $R^2$ is carbomethoxy, $R^3$ is methyl, and $R^4$ is methoxy.

8. A compound according to claim 5 wherein $R^1$ is methyl, $R^2$ is hydroxymethyl, $R^3$ is methyl, and $R^4$ is methoxy.

9. A compound according to claim 1 wherein Z is a carbon-carbon double bond.

10. A compound according to claim 9 wherein $R^1$ is methyl, $R^2$ is carboxy, $R^3$ is methyl, and $R^4$ is methoxy.

11. A compound according to claim 9 wherein $R^1$ is methyl, $R^2$ is carbomethoxy, $R^3$ is methyl, and $R^4$ is methoxy.

12. A compound according to claim 9 wherein $R^1$ is methyl, $R^2$ is hydroxymethyl, $R^3$ is methyl, and $R^4$ is methoxy.

References Cited

UNITED STATES PATENTS 3,547,953  12/1970  Miyano _____ 260—345.3

JOHN M. FORD, Primary Examiner

U.S. Cl. X.R.

424—283

UNITED STATES PATENT OFFICE
CERTIFICATE OF CORRECTION

Patent No. 3,803,178                    Dated April 9, 1974

Inventor(s) JOHN H. FRIED               (Page 1)

It is certified that error appears in the above-identified patent and that said Letters Patent are hereby corrected as shown below:

Column 3, lines 40-47, change

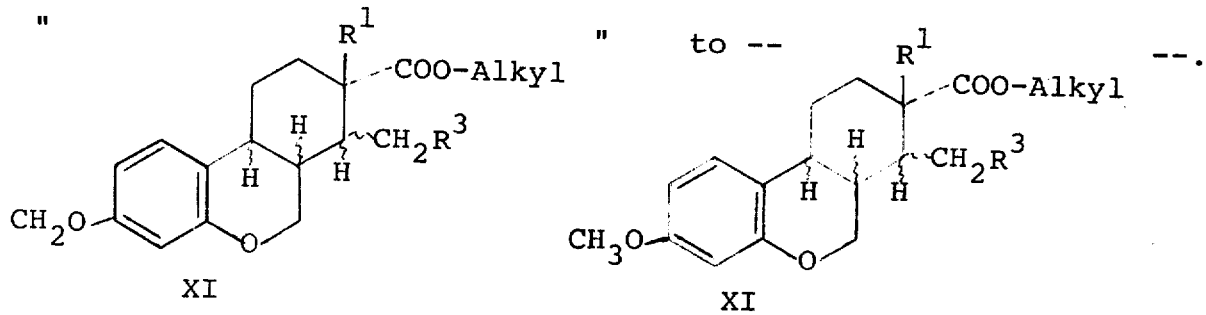

Column 3, lines 51-58, change

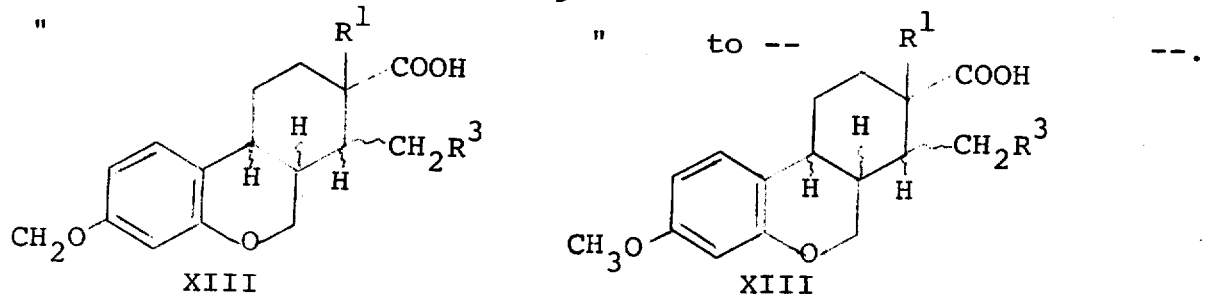

Column 5, line 4, change "cm.$^2$." to --cm.$^2$--.

Column 5, line 31, change "hydrogen-over-voltage" to --hydrogen over-voltage--.

Column 5, line 44, change "cm.$^2$.," to --cm.$^2$,--.

UNITED STATES PATENT OFFICE
CERTIFICATE OF CORRECTION

Patent No. 3,803,178              Dated   April 9, 1974

Inventor(s) JOHN H. FRIED                (Page 2)

It is certified that error appears in the above-identified patent and that said Letters Patent are hereby corrected as shown below:

Column 5, line 55, change "of" to --at--.

Column 6, line 1, change "line" to --lines--.

Column 7, line 62, change "-oxo-" to -- -oxa- --.

Column 12, line 13, change "ester" to --esters--.

Column 12, line 22, change "-oxo-" to -- -oxa- --.

Column 14, lines 38-46, claim 1, change

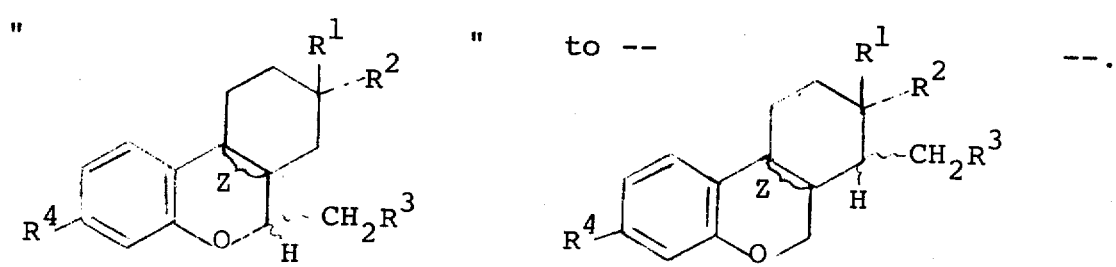

Signed and sealed this 10th day of June 1975.

(SEAL)
Attest:

RUTH C. MASON
Attesting Officer

C. MARSHALL DANN
Commissioner of Patents
and Trademarks